United States Patent [19]

Belbouche

[11] Patent Number: 4,858,430
[45] Date of Patent: Aug. 22, 1989

[54] THRUST REVERSER FOR A TURBOFAN ENGINE

[75] Inventor: Lionel A. Belbouche, Harfleur, France

[73] Assignee: Societe Nationale d'Etude et de Construction de Moteurs d'Aviation (SNECMA), Paris, France

[21] Appl. No.: 222,555

[22] Filed: Jul. 21, 1988

[30] Foreign Application Priority Data

Jul. 29, 1987 [FR] France ............... 87 10730

[51] Int. Cl.$^4$ ............................. F02C 1/70
[52] U.S. Cl. ................... 60/226.2; 60/230; 239/265.27
[58] Field of Search .............. 60/226.2, 230; 239/265.29, 265.27, 265.31, 265.25; 244/110 B, 12.5, 23 D

[56] References Cited

U.S. PATENT DOCUMENTS

| | | | |
|---|---|---|---|
| 3,280,561 | 10/1966 | Kutney | 60/226.2 |
| 3,567,128 | 3/1971 | Urquhart et al. | 239/265.29 |
| 3,570,767 | 3/1971 | Lawson et al. | 239/265.29 |
| 3,716,207 | 2/1973 | Schweikl et al. | 239/265.29 |
| 3,815,357 | 6/1974 | Brennan | 60/226 A |
| 4,216,923 | 8/1980 | Harris | 239/265.27 |
| 4,340,178 | 7/1982 | Lawson | 239/265.31 |
| 4,410,152 | 10/1983 | Kennedy et al. | 244/110 B |
| 4,485,970 | 12/1984 | Fournier et al. | 239/265.29 |

Primary Examiner—Donald E. Stout
Attorney, Agent, or Firm—Bacon & Thomas

[57] ABSTRACT

The present invention relates to an improved thrust reverseer door structure having a deflector that will reduce the aerodynamic losses and thereby increase the operating efficiency of a turbofan engine. The deflector has a first portion that extends generally radially inwardly when the door is in its retracted position and a second portion extending in a downstream direction from the distal edge of the first portion. The downstream facing second portion is located adjacent the inner surface of a secondary-duct wall and serves to deflect the air passing through this annular space away from an inner, concave portion of the thrust reverser door. The deflector may also include aperatures in the first portion to allow passage of the thrust reversing gases when the door is in its extended position. A baffle may also be attached to the first portion so as to extend at an angle over the aperatures.

4 Claims, 3 Drawing Sheets

THRUST REVERSER FOR A TURBOFAN ENGINE

BACKGROUND OF THE INVENTION

The present invention relates to a thrust reverser for a turbofan-type jet engine, more particularly such a system incorporating a thrust reverser door having a gas flow deflector.

Turbojet engines of the turbofan-type are well known in the art and typically comprise a primary exhaust gas duct to exhaust the high temperature gases after passing over the stages of the turbine. Turbofan-type engines also include a secondary duct concentrically located about the primary exhaust gas duct so as to define an annular space therebetween. Large diameter turbofans, typically mounted on the front of the jet engine, direct air through this annular space to increase the performance characteristics of the engine.

Thrust reversers are also well known in the art and usually comprise one or more thrust reverser doors serving to redirect the flow of gases from their normal upstream to downstream direction to a direction which has a component in the forward direction In civilian aircraft applications, where such engines have a relatively high bypass ratio (i.e. the ratio of the quantity of gases passing through the secondary or cold flow annular space to the quantity of gases passing through the primary duct), the thrust reverser may be applied solely to the secondary or cold flow duct. In that instance, the thrust reverser door and the actuating mechanism are usually integrated into the wall of the secondary duct.

In such known systems, the thrust reversing doors are displaceable between a retracted position, in which they form a part of the outer wall of the secondary duct and do not impede the air flow through the annular space, and an extended position in which the door will block at least a portion of the air flowing through the annular space and re-direct it in a direction having a forward acting component.

Thrust reversing doors may assume various shapes, from the semi-shell curved door noted in French Patent No. 2,490,731 to a plurality of flap-type structures illustrated in U.S. Pat. Nos. 4,410,152 to Kennedy et al. and 4,485,970 to Fournier et al.; and French Patent No. 2,559,838.

In the latter instance where a flap-type door is utilized, a deflector will usually be attached to the upstream edge of the door so as to redirect the gas flow to have a more forward acting component. In order to provide for adequate performance of the thrust reverser, this deflector must have a minimum length extending inwardly from the inner surface of the thrust reverser door. In order to accommodate this length when the door is in a retracted or normal thrust position, the inner wall of the secondary duct usually is located adjacent to the end of the deflector in order to prevent the deflector from extending into the annular air space and disrupting the air flow.

However, in order to maximize the performance of the thrust reverser, the inner surface of the door usually defines a cavity or a concave portion. When the door is in its retracted position, this concavity is located downstream of the deflector. The presence of this concavity when the thrust reverser door is in the retracted position produces aerodynamic losses in the air flow passing through the annular space of the secondary duct, thereby reducing the efficiency of the engine when in the normal thrust mode

SUMMARY OF THE INVENTION

The present invention relates to an improved thrust reverser door structure that will reduce the aerodynamic losses of the prior art structures and thereby increase the operating efficiency of the turbofan engine. The deflector according to the invention has a first portion that extends generally radially inwardly when the door is in its retracted position and a second portion extending in a downstream direction from the distal edge of the first portion. The downstream facing second portion is located adjacent the inner surface of the inner secondary-duct wall and serves to deflect the air passing through the annular space away from the concave portion of the thrust reverser door.

The deflector according to the invention may also include an aperture defined in the first portion to allow passage of the thrust reversing gases when the door is in its extended position. A baffle may also be attached to the first portion so as to extend at an angle therefrom and to partially extend over the aperture so as to redirect the air passing therethrough so as to have a more forward acting component. Thus, the deflector according to the invention not only increases the aerodynamic efficiency of the device when the door is in the retracted position, but also increases thrust reversing effect when the door is in its extended position

DETAILED DESCRIPTION OF THE PREFERRED EMBODIMENTS

Figure 1:
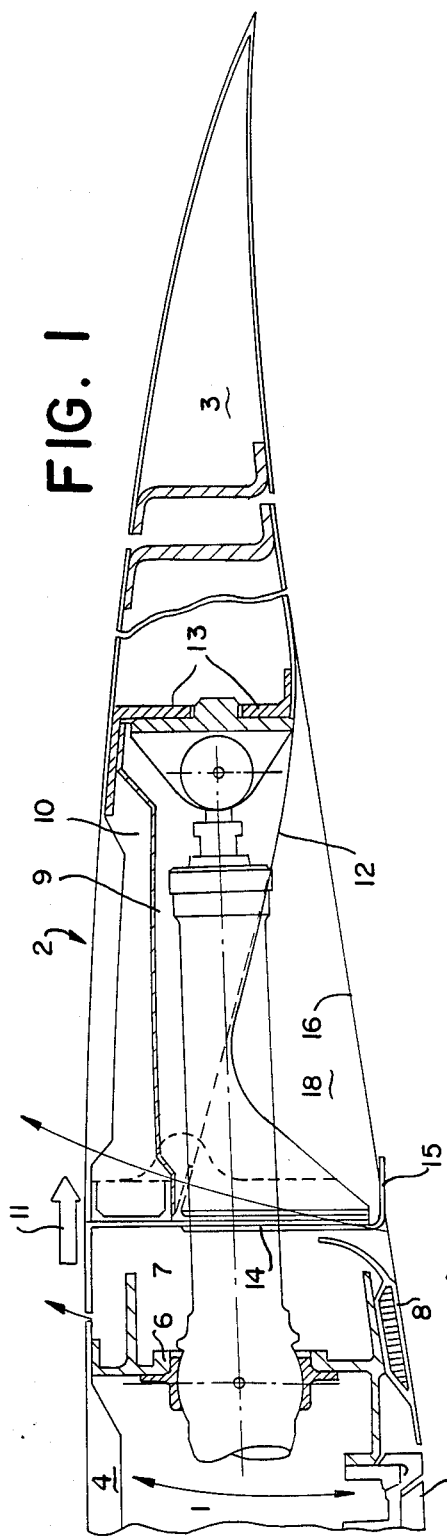
FIG. 1 is a partial, longitudinal sectional view showing a secondary duct defining the outer limits of the annular space through which secondary air flows.

The turbojet engine thrust reverser system according to the invention comprises a thrust reverser door having an upstream edge located adjacent a fixed portion 1 of the secondary annular duct which defines the outer limits of an annular space through which the air generated by the turbofan passes. The annular secondary duct 1 has a stationary rear collar 3 located downstream of the moveable thrust reverser portion 2 and is disposed generally coaxially with the primary exhaust gas duct (not shown) and coaxially with the longitudinal axis of the turbojet engine. The upstream fixed portion 1 of the secondary duct includes an outer panel 4 which defines an outer flow surface and inner panel 5 which defines a inner flow surface for the secondary air passing through annular space. An annular frame 6 serves to interconnect the outer panel 4 and the inner panel 5 and to provide a mounting structure for the thrust reverser door actuater 7. Actuater 7, as is well known in the art, may comprise a power cylinder having an extensible and retractable piston rod, the distal end of which is connected to the thrust reverser 2 in known fashion.

The terms upstream and downstream utilized in this application, are defined relative to the ordinary direction of the hot exhaust gas circulation and the secondary air circulation through the annular space, which are from left to right as indicated in FIG. 1. These directions are assumed to be when the thrust reverser door is retracted and the engine is operating under the normal thrust mode.

The moveable thrust reverser portion 2 comprises a door 9 having an outer surface panel 10 which, in its retracted position, is generally coextensive and flush with the surface defined by outer panel 4 so as to provide a relative smooth outer air flow indicated by arrow 11. The door 9 also has an inner panel 12 to define an inner surface of the door, the outer and inner panels 10 and 12 being joined by internal structure 13.

A deflector 14 is attached to the upstream edge of the thrust reverser door 9 and extends in a generally radially inward direction as indicated in FIG. 1, when the door 9 is in its retracted position and the engine is operating in the normal thrust mode. The deflector portion 14 is located downstream of fixed deflection edge 8 when the door 9 is in its retracted position. An extension 15 is attached to the distal edge of the deflector portion 14 and, as indicated in FIG. 1, extends in a generally downstream direction therefrom. The direction and contour of the extension 15 approximate the smooth aerodynamic line 16 interconnecting the fixed deflection edge 8 with the fixed rear coller 3. This theoretical aerodynamic line 16 illustrates a surface which would provide the greatest aerodynamic efficiency and the least amount of perterbations to the air passing through the annular space in the direction of arrow 17.

However, the inner surface 12 of door 9 has a concave shape which defines a concavity 18, this shape being provided to maximize the thrust reversing capability of the door when it is in its extended position. The presence of extension 15 serves to deflect the air passing in a downstream direction of arrow 17 through the annular space and prevent the air from entering the concavity 18 and creating turbulence in the air flow. By reducing this turbulence, the extension 15 serves to increase the efficiency the air flow passing through the annular space. The extension 15 forces the air to travel in a path approaching that of the theoretical aerodynamic line 16.

Figure 2:
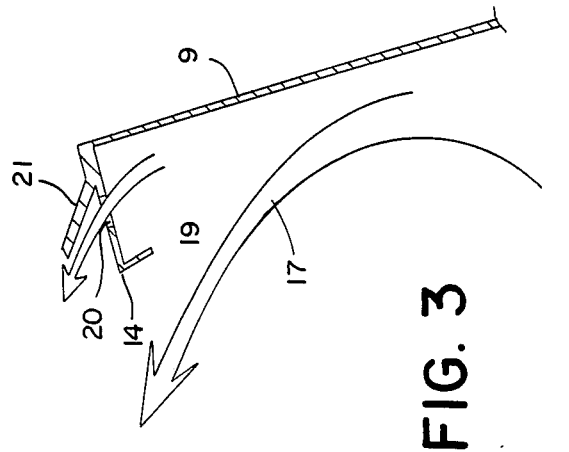
FIG. 2 is a schematic diagram of a first embodiment of the thrust reverser door according to the invention in its extended position.
Figure 3:
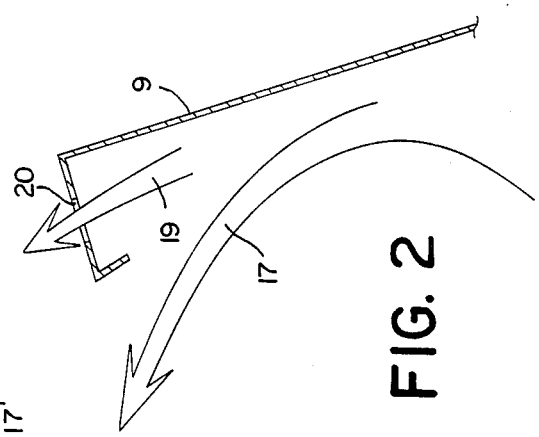
FIG. 3 is a schematic representation of an alternative embodiment of the thrust reverser door according to the invention also shown in its extended position.
Figure 1A:
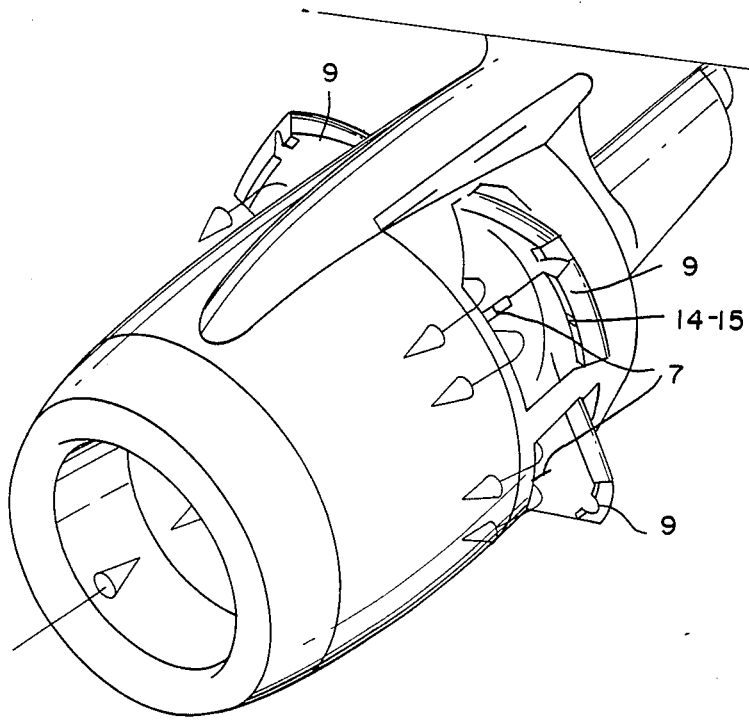
FIG. 1a is a partial, perspective view showing the thrust reverser doors according to the invention in their extended positions.
Figure 1B:
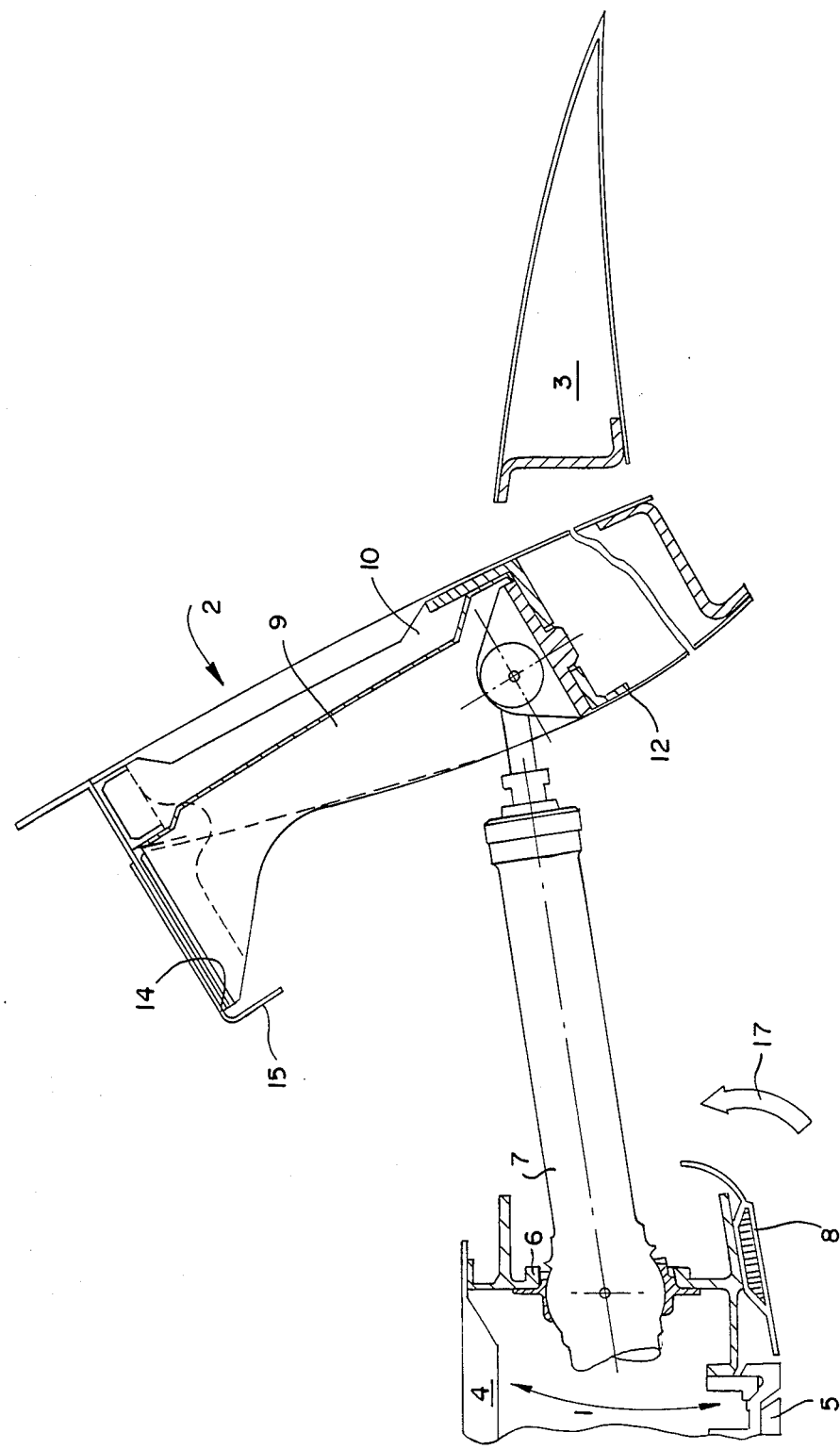
FIG. 1b is a partial, longitudinal sectional view corresponding to FIG. 1, illustrating the thrust reverser door in an extended position.

In some applications, the presence of the deflector extension 15 may serve to reduce the reverse flow of the air when the thrust reverser door is in its extended position. In this instance, the deflector 14 may define one or more apertures 20. The aperatures allow a portion of the deflected air streams 17 to pass therethrough, in the direction of arrow 19 illustrated in FIG. 2, so as to restore the thrust reversing capabilities of the thrust reverser door incorporating extension 15.

In order to further increase the forwardly directed thrust component of the air passing in the direction of arrow 19, a baffle 21 may be attached to deflector portion 14 and extend therefrom at an angle over the apertures 20 so as to further direct the air 19 in the forward direction. Baffles 21 may be rigidly affixed to the deflector portion 14 or may be affixed thereto such that the angle between the baffle and the deflector portion 14 is adjustable.

The foregoing description is provided for a illustrative purposes only and should not be construed as any way limiting this invention, the scope which is defined solely by the appended claims

I claim:

1. In a turbojet engine of the turbofan type having a primary duct for exhausting hot gases in a downstream direction and a secondary annular duct concentrically arranged about the primary duct as to define an annular space therebetween for exhausting cold air in a downstream direction, the secondary duct having an inner air flow surface, an outer air flow surface, and defining at least one laterally extending opening, the improved thrust reverser comprising:
    (a) at least one thrust reversing door attached to the secondary duct, the door having an upstream edge, a downstream edge, an outer air flow surface and a generally concave inner surface;
    (b) actuating means connected between the door and the secondary duct to move the door between a retracted position in which the door extends over the lateral opening such that the air flow through the secondary duct is unimpeded and the outer air flow surface of the door is substantially flush with the outer air flow surface of the secondary duct, and an extended position in which the door redirects the air passing through the annular space through the lateral opening in a direction having an upstream acting component; and,
    (c) a deflector attached to the upstream edge of the door, the deflector having (i) a first portion extending generally perpendicular to the direction of air flow when the door is in its retracted position, and (ii) a second portion extending from the first portion in a dowstream direction so as to direct air flowing through the secondary away from the generally concave inner surface of the door.

2. The improved thrust reverser according to claim 1 wherein the first portion of the deflector defines at least one aperture to allow passage of air therethrough when the door is in its extended position.

3. The improved thrust reverser according to claim further comprising a baffle attached to and extending at least partially over the aperture.

4. The improved thrust reverser according to claim 3 further comprising means to adjust the angle between the baffle and the first portion of the deflector.

* * * * *

UNITED STATES PATENT AND TRADEMARK OFFICE
CERTIFICATE OF CORRECTION

PATENT NO. : 4,858,430                                                  Page 1 of 2

DATED     : Aug. 22, 1989

INVENTOR(S) : Lionel A. Belbouche

It is certified that error appears in the above-identified patent and that said Letters Patent is hereby corrected as shown below:

On the title page:
   Item [73], the assignee should be --Societe Anonyme Dite : Hispano Suiza, Saint Cloud, France--.

On the title page, in the ABSTRACT:
   Line 2, change "revverseer" to --reverser--;
   Line 13, change "aperatures" to --apertures--.

Column 1, line 24, after "direction", insert --.--.

Column 2, line 2, after "mode", insert --.--;
          line 29, after "position", insert --.--.

Column 3, line 31, "coller" should be --collar--
          line 45, after "efficiency", insert --of--.
          line 53, "aperatures" should be --apertures--.
Column 4, line 10, delete "a";
          line 13, after "claims", insert --.--
Column 4:
Claim 1, line 44, "dowstream" should be --downstream--;
          line 45, after "secondary", insert --duct--.

Claim 3, line 51, after "claim", insert --2--

UNITED STATES PATENT AND TRADEMARK OFFICE
CERTIFICATE OF CORRECTION

PATENT NO. : 4,858,430

DATED : Aug. 22, 1989

INVENTOR(S) : Lionel A. Belbouche

It is certified that error appears in the above-identified patent and that said Letters Patent is hereby corrected as shown below:

Column 4:
Claim 3, line 52, after "extending", insert --at an angle from the first portion of the deflector--.

Signed and Sealed this

Twenty-ninth Day of October, 1991

Attest:

HARRY F. MANBECK, JR.

*Attesting Officer*          *Commissioner of Patents and Trademarks*